United States Patent

[11] 3,534,810

| [72] | Inventor | Uri Limoni<br>Lincoln Park, New Jersey |
|---|---|---|
| [21] | Appl. No. | 774,023 |
| [22] | Filed | Nov. 7, 1968 |
| [45] | Patented | Oct. 20, 1970 |
| [73] | Assignee | Blazer Corporation<br>East Rutherford, New Jersey<br>a corporation of New Jersey |

[54] COMPUTER ENVIRONMENT CONDITIONING APPARATUS
3 Claims, 1 Drawing Fig.

[52] U.S. Cl. .................................................. 165/47,
165/53, 165/60
[51] Int. Cl. ..................................................... F24h 3/00
[50] Field of Search ........................................... 165/60, 49,
50, 53—57, 29, 122, 35, 36; 34/57; 62/407, 408

[56] References Cited
UNITED STATES PATENTS

| 2,392,553 | 1/1946 | Rollins | 165/50 |
| 3,267,831 | 8/1966 | Day | 165/49 |
| 3,267,995 | 8/1916 | Maudlin | 165/29 |

Primary Examiner—Robert O'Leary
Assistant Examiner—Charles Sukalo
Attorney—Davis, Hoxie, Faithfull and Hapgood

ABSTRACT: Computer environment conditioning apparatus employs a vertical air discharge duct having selectively blocked output ports at opposite extremities thereof. Conditioned air is supplied to the discharge duct intermediate the output ports through a fixed path including a humidifying chamber and a heat exchanging (cooling and/or heating) element under blower fan urging. The output air flow passes to the computer area, either directly via the upper output port or through overhead ducting, or by way of the lower output duct port and a channel between raised and subflooring levels.

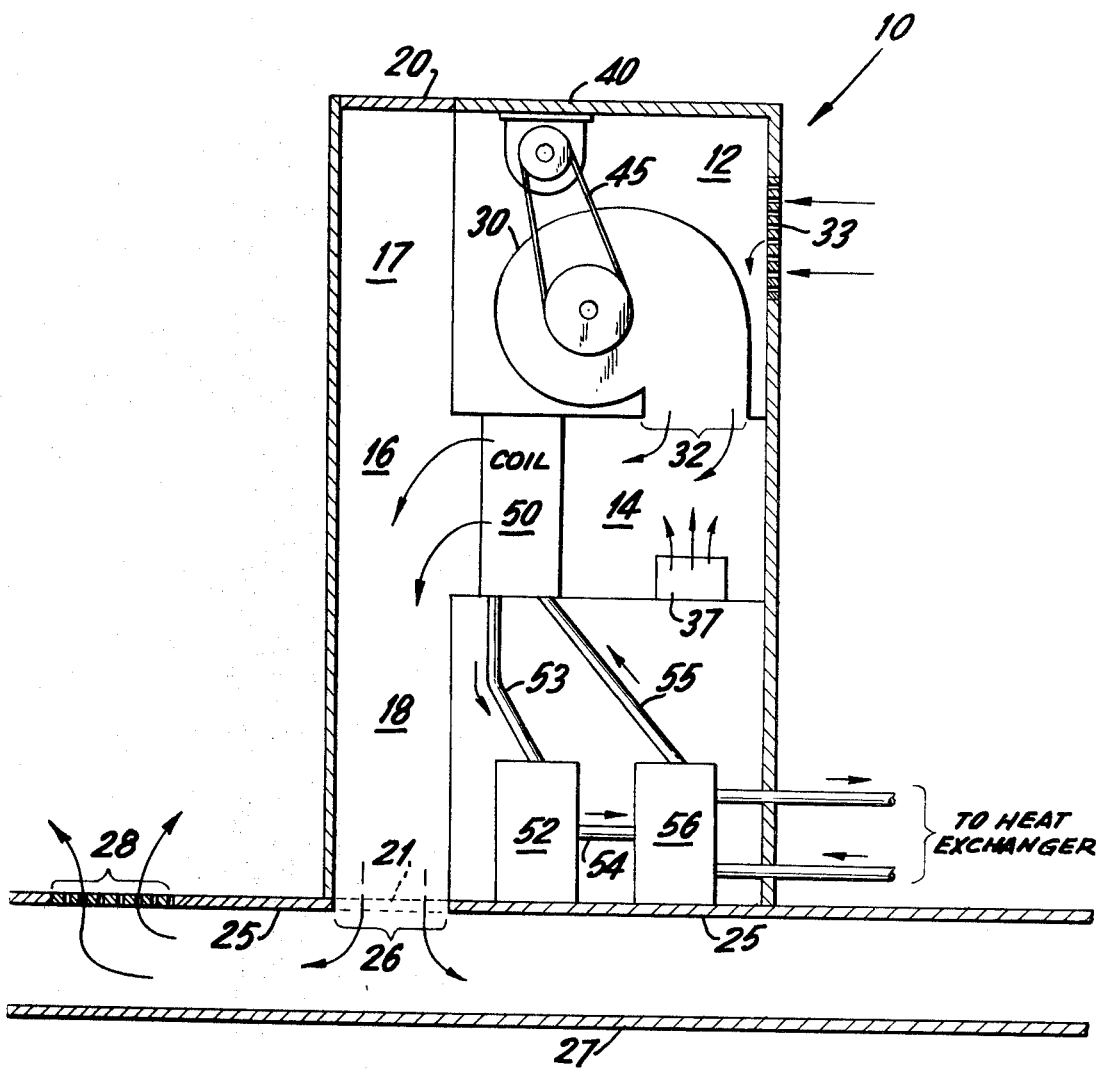

COMPUTER ENVIRONMENT CONDITIONING APPARATUS

This invention relates to environmental regulating systems and, more specifically, to a flexible computation center atmosphere conditioning apparatus operative for discharging air into a computer area either directly, through an overhead duct, or upward through grills in the upper level of an interfloor air distribution channel.

As has long been recognized, electronic computation machines function most reliably when the surrounding environment is closely controlled, e.g., as to temperature, humidity, dust particles and the like. In many computation centers, the computers and the many peripheral equipments associated therewith, such as input/output devices, auxiliary data storage elements and the like have been physically placed on a raised flooring, with the extensive power and signal distribution cabling required to interconnect the computation elements being placed between the raised and subfloor levels for protection, convenience and appearance considerations. Accordingly, the air conditioning equipment for such apparatus has discharged its output conditioned air stream into the channel spacing between the flooring levels for distribution, with the air passing into the main computer area through grills placed in the raised level.

Correspondingly, other somewhat more recent computer organizations have been of the monolithic type wherein the computer, its composite memory and/or other attendant equipment items are physically joined into one unitary structure. Accordingly, the extensive external cabling characterizing prior arrangements is not required and, therefore, neither is an interfloor spacing to accomodate such cabling. For this unitary computer arrangement, the air conditioning apparatus must discharge directly into the volumetric area where the sensitive equipment is located.

Of course, there are many applications where it will be desired to provide for conditioned air discharging into either a subfloor channel or into a computer containing area directly at the desire of the user. This requirement arises for example, when hybrid equipments are employed, e.g., some requiring subfloor cabling and some not having this requirement, or where the user desires a flexible environmental condition apparatus to provide for future employment of either type of computing equipment as his needs from time to time dictate. However, an entirely satisfactory flexible environment regulating system for conveniently providing direct, overhead duct and/or floor-spaced air discharge has not heretofore been available.

It is thus an object of the present invention to provide an improved computer environment conditioning system.

More specifically, an object of the present invention is the provision of a computer center air conditioning arrangement which provides for direct, overhead duct or floor-spaced air discharge at the option of the user, without requiring extensive physical readjustment as the air delivery mode is varied.

The above and other objects of the present invention are realized in a specific, illustrative computer area air conditioning system employing a vertical air delivery duct having a removable output port covering plates at opposite extremities thereof. A motor driven blower fan is employed to draw room air through an input grill, and to drive the air into the output delivery duct between the two output ports via a humidifying chamber and a heat exchanging cooling or heating coil.

The arrangement may be employed to service computer installations by removing the lower port covering plate (the upper plate remaining in place) and positioning the air discharge duct over an aperture in a raised flooring. Air is then driven by the blower fan into the computing area through a humidifier chamber and coil, down through the discharge duct between the floor levels, and upward through the grills in the raised flooring.

Alternatively, with the lower orifice in the discharge duct blocked and the upper port open, air is forced by the fan upward through the discharge duct and directly outward into the computing area, or through an overhead duct distributing system.

For either of the above modes of operation, the air trapped in the blocked portion of the discharge duct provides air cushioning which inhibits turbulence about the cooling coil, thus enhancing cooling efficiency.

A complete understanding of the present invention and of the above and other features and advantages thereof, may be gained from a consideration of the following detailed description of an illustrative embodiment thereof presented hereinbelow in conjunction with the accompanying drawing which depicts in schematic form a computer environment conditioning apparatus employing the principles of the present invention.

Referring now to the drawing, there is shown an air conditioning apparatus 10 for controlling the temperature, humidity and waste particle content of a surrounding environment adapted for computer usage. The arrangement comprises a first chamber 12 having an air input grill 33, preferably including an air filter, and including therein an air circulating centrifugal blower fan 30 coupled by a belt 45 to a fan driving motor 40. The fan 30 drives air via a fan output port 32 into and through a chamber 14 having therein a humidifier 37. The humidifier 37, of any well known type, advantageously includes a sensing element for supplying water vapor into the chamber 14 when the air exiting from the composite apparatus 10 is detected as exhibiting less than desired relative humidity.

A vertical air discharge duct 16 having upper and lower portions 17 and 18 is included in the structure 10 and connected to the chamber 14 by way of a heat exchanging cooling element 50, e.g., an evaporation cooling coil. The cooling coil 50, well known to those skilled in the art, includes a continuous run of piping having a refrigerant, e.g., Freon (a trademark of the DuPont Corporation for such a material), chilled water or glycol, or the like passing therethrough. Vaporized refrigerant exiting from the coil 50 is supplied by a conduit 53 to a compressor 52 for pressurized liquification, and passes to a condenser 56 through a tube 54 for cooling, with heat passing from the condenser to a remote heat exchanger such as an evaporative cooling tower. The relatively cooled liquid refrigerant is returned under pressure to the cooling coil 50 by way of a conduit 55.

The coil 50, and its ancilliary structure 52, 53, 54, 55, 56 form a conventional cooling arrangement for cooling air as it passes through the coil from the chamber 14 to the output duct 16 under urging of the fan 30. In brief, relatively cooled, liquified refrigerant is vaporized by throttling valves at the input to the coil 50. The gaseous refrigerant is then liquified under pressure in the compressor 52, cooled in the condenser 56 and returned to the coil 50. As air passes through the coil 50, a quantum of heat energy given by the heat of vaporization of the evaporated refrigerant is removed from the air which is thereby cooled.

When used in conjunction with computer installations having raised floorings, such as shown in the drawing, a plate 20 is included to block the top of the upper discharge duct portion 17 while the lower duct portion 18 is unblocked, i.e., the plate 21 shown dashed in the drawing is not present. The bottom of the duct 16 is placed over an aperture 26 in a raised floor 25, with the floor 25 including a plurality of grills 28.

Air enters the conditioning apparatus 10 through the input grill 33 in the top of the chamber 12, is purified as it passes through the filter therepresent, and is driven into the chamber 14 by the fan 30 which, in turn, is energized by the motor 40. If the air is too dry, the humidifier 37 supplies water vapor into the chamber 14 where it is picked up by the air stream passing therethrough. The air is next driven through the coil 50 where it is cooled (assuming that the compressor 52 is energized responsive to the associated sensor signaling that the ambient air requires cooling), and next supplied to the duct 16. Since the top of the duct 16 is blocked by the plate 20, the air passes downward through the lower duct portion 18, through the floor aperture 26, between the raised and subflooring 25 and 27, and upward into the computing area via the grills 28.

It is observed that the air trapped in the upper duct portion 17 acts as an air cushion to absorb and compensate for the perturbations in the air flow exiting from the coil 50. Thus, turbulence at the output of the coil 50 is obviated, thereby enhancing cooling efficiency.

To operate the environmental conditioning apparatus 10 in a direct air discharge mode (with the apparatus 10 mounted on either a standard or a raised floor), the user simply inserts the lower port blocking plate 21 and removes the other blocking plate 20. The arrangement operates in the above-described manner except that air now exits from the top of the duct 16. The conditioned air may pass directly to the computer area, or may pass thereto via a plenum chamber and ducting employed for air distribution and/or further air treating purposes. As before, the air cushion, now exiting in the lower duct portion 18 ensures a smooth, regular air flow about the output sides of the coil 50 for efficient cooling. In addition plates 20 and 21 may be simultaneously removed, or removed in part, to simultaneously provide both modes of cooling.

Thus, the arrangement illustrated in the drawing has been shown by the above to be operative under user control to condition a computer environment either directly, or employing air routing via a floor-spaced channel.

It is to be understood that the above-described arrangement is only illustrative of the principles of the present invention. Numerous modifications and adaptations thereof will be readily apparent to those skilled in the art without departing from the spirit and scope of the present invention. For example, a heating element may be placed in the path of the air stream between the fan output 32 and the duct 16. The heating element may be of any well known type, e.g., electrical resistance, or steam or hot water conveying coils, and controlled by a temperature sensing thermostat.

I claim:

1. In combination in a computer environment conditioning arrangement adapted for selectively supplying conditioned air to a computer area directly and via a floor-spaced channel and air passageways connecting said channel and said computer area under user control and selection, said conditioning arrangement comprising a vertical air discharge duct having first and second discharge ports, said first discharge port being included at the bottom of said duct and said second discharge port being included at the top of said duct, means for supplying conditioned air to said vertical duct via a fixed path intermediate said first and second discharge ports, means for selectively blocking said second discharge port when conditioned air is to be supplied to the interfloor spacing, means for selectively blocking said first discharge port when air is to be supplied directly to a computer area, said conditioned air supplying means comprising an input port, blower means, a substantially horizontal duct, heat exchanging cooling means located within said horizontal duct, said horizontal duct intersecting said vertical discharge duct intermediate said first and second ports.

2. A combination as in claim 1 wherein said heat exchanging means comprises a cooling coil, and compressor and condenser means connected to said cooling coil.

3. A combination as in claim 1 where in said conditioned air supplying means further includes humidifying means.